Patented Mar. 28, 1944

2,345,456

UNITED STATES PATENT OFFICE 2,345,456

ALDEHYDE CONDENSATION PRODUCTS OF S-BENZYL THIOAMMELINE

Herman A. Bruson, Philadelphia, Pa., assignor to The Resinous Products & Chemical Company, Philadelphia, Pa.

No Drawing. Application May 21, 1940, Serial No. 336,359

17 Claims. (Cl. 260—42)

This invention relates to reaction products of S-benzyl thioammeline and aldehydes, particularly formaldehyde. It also relates to complex condensation products of S-benzyl thioammeline, an aldehyde and other substances which are capable of forming condensation products with aldehydes, particularly those which form methylol compounds when reacted with formaldehyde.

In copending applications, Serial Nos. 323,699 filed March 13, 1940, and 283,740 filed July 11, 1939, of which this application is a continuation-in-part, a method of making ethers of thioammeline by condensing the thioammeline with an alkyl or aralkyl halide in the presence of an alkali is disclosed. These applications also disclose that the thioammeline ethers will react with aldehydes to form resinous compositions. Among the thioammeline ethers described in these applications is S-benzyl thioammeline.

It has now been found that resinous materials of particular value may be obtained from the reaction between an aldehyde and S-benzyl thioammeline as well as those S-benzyl thioammelines which have substituents in the benzyl radical such as alkyl, aryl, acyl, alkoxy, aryloxy, cycloalkyl, halogen and other groups. Formaldehyde is preferred for the purposes of the present invention but others may also be employed among which are acetaldehyde, benzaldehyde and furfural. Mixtures of aldehydes may also be used. Substances which generate formaldehyde, such as methylal, paraformaldehyde and substances containing reactive methylol groups, such as the methylol ureas or methylol phenols, may be used to replace part or all of the aldehyde employed in the condensation with the S-benzyl thioammeline. The methylol ureas can be formed directly in the reaction mixture by adding urea or thiourea to the initial mixture of the S-benzyl thioammeline and the aldehyde. Hexamethylene-tetramine may also be used as a source of formaldehyde and has the advantage that it assists in maintaining the neutrality of the solution in which the reaction takes place.

The resins are prepared in general by heating a mixture of the S-benzyl thioammeline and the aldehyde in a solvent such as water, an alcohol or a mixture of water and alcohol. S-benzyl thioammeline is only slightly soluble in water but when stirred in a warm solution of formaldehyde it forms methylol compounds which are readily soluble. On further heating these methylol derivatives of S-benzyl thioammeline condense to products of higher molecular weight which, on cooling the aqueous solution, separate along with the initial methylol addition product. The material which separates out in this manner is free of solvent and can be used directly in the preparation of molding powders and other products. On heating to about 150° C. the material fuses to a clear mass which can be easily ground to a powder for further use. If it is desired, the precipitation of the condensation product from the aqueous solution may be prevented by adding alcohol to the reaction mixture before, during or after condensation. The methylol derivatives which are first formed condense progressively on further heating until finally an insoluble resin is formed.

When the reaction between formaldehyde and the S-benzyl thioammeline is carried out in an anhydrous alcohol solution, the alcohol takes part in the condensation particularly when an acid catalyst is employed and the water formed by the condensation is removed as rapidly as it is formed.

The reaction, whether in aqueous or alcoholic solution, may be carried out under widely varying conditions. It is usually most convenient to heat the reaction mixture to its boiling point at atmospheric pressure under a reflux condenser but lower temperatures may be employed as well as higher ones, in the latter case by operating in a closed system under pressure. The most practical range is from 75 to 125° C. In general the reaction is carried out at a pH of 6 to 8 but solutions of higher or lower pH values may be employed when desired. The pH value is most conveniently established and maintained by means of buffers. Ordinarily when formaldehyde is used to react with the S-benzyl thioammeline the acid naturally present in the aldehyde is sufficient to establish a convenient hydrogen ion concentration for carrying out the condensation. This can be varied to suit any special conditions by adding the proper amounts of an alkaline or acidic reagent. For the conversion of the initially formed methylol derivative of the S-benzyl thioammelines or one of the intermediate condensation products to the final insoluble state it is advisable to use an acid catalyst. This final condensation can, however, be carried out in the absence of catalysts. Some salts and buffers when present in appreciable amounts during the initial condensation or added to the aqueous solution after the formation of the intermediate product have a noticeable effect on the character of the resin. Salts such as the alkaline earth chlorides, magnesium chloride, and zinc chloride, when present to the extent of 2 to 20% of the amount of S-benzyl thioammeline have a decided stabilizing action on the condensation products. Potentially acid salts such as aluminum sulfate act as catalysts in the final hardening of the resins.

When the S-benzyl thioammeline-aldehyde-alcohol condensates such as are obtained by carrying out the reaction between the S-benzyl thioammeline and the aldehyde in an anhydrous alcoholic solvent are desired, the reaction may be started in the anhydrous alcohol or in an aqueous medium and the water replaced by an alcoholic solvent during the course of the condensation. The alcohols used for this purpose may be mono- or polyhydric alcohols of the aliphatic, aromatic, cycloaliphatic and heterocyclic series and also alcohols containing other reactive groups such as aldehydo, amino, carboxyl, oxy, halogeno, keto groups, etc. Complex alcoholic compounds such as those obtained by the partial esterification of polyhydric alcohols with mono- or polycarboxylic acids may also be used. Among such are the alkyd resins of the oil-modified type containing excess glycerol and glyceryl mono- or di esters of fatty acids. The condensation products of aldehyde, S-benzyl thioammelines and the higher molecular weight alcohols can be made by direct reaction but it is sometimes advisable to prepare the condensation product of one of the lower aliphatic alcohols such as ethyl, propyl, butyl, amyl, etc., and then replace this by heating the condensation product with the higher boiling alcohol.

The condensation in anhydrous alcohol is best carried out in the presence of small amounts of an acid catalyst and during the process it is advisable to remove the water of condensation as rapidly as it is formed. The organic acids such as formic, acetic, tartaric, lactic, phthalic, oxalic, etc., can be used in amounts ranging from about 0.25 to 10% calculated on the total amount of reactants in the mixture. When inorganic acids are employed much smaller amounts are effective. For example, 0.05% of nitric, hydrochloric, sulfuric or phosphoric acid is sufficient.

The ratio of formaldehyde to the S-benzyl thioammeline may vary over a considerable range. Generally speaking from 2 to 4 mols of aldehyde will be employed per mol of the S-benzyl thioammeline with about 4.5 mols being a maximum for ordinary commercial purposes. Larger amounts of aldehyde may be used if desired and often with advantage due to the stabilizing effect of the excess aldehyde on the intermediate condensation product. Apparently an excess of aldehyde inhibits the final condensation to the infusible stage and hence is of advantage in solutions of the intermediate condensation product which are to be stored for any length of time. In some cases as much as 20 mols of aldehyde can be used. When the intermediate product containing the excess aldehyde is to be converted to the final hardened state the excess is removed. This can be done by evaporation or by reacting it with some other material such as urea, thiourea, a phenol, dicyandiamide, another triazine or additional S-benzyl thioammeline. Primary or secondary amines, amides of mono- or polybasic carboxylic acids or sulfone amides may also be employed to react with any excess aldehyde. Similarly S-benzyl thioammeline may be used to combine with excess formaldehyde in other condensations, for example in phenol or urea formaldehyde condensation products. In this way co-condensed resins are obtained. Such resins may also be obtained by mixing the S-benzyl thioammeline, formaldehyde and another compound capable of forming resins with formaldehyde and heating to bring about the reaction. Phenols, urea, thiourea, other triazine compounds, etc., may be thus employed. The combined resins may also be made by reacting the intermediate condensation product of S-benzyl thioammeline with an intermediate condensation product of a different type for example, a phenol aldehyde, urea aldehyde, aniline aldehyde, sulfonamide aldehyde, furfural resins and alkyd resins. In order to retain the desirable properties of the S-benzyl thioammeline resins in such mixtures at least one part should be employed with every three parts of the second resinous material.

In all of these resins, whether consisting of the S-benzyl thioammeline-aldehyde condensation product alone or mixed with other resins, plasticizers, fillers, coloring materials, etc., may be employed. Suitable fillers are wood-flour, ground nut shells, cotton linters, α-cellulose flock, paper fibers, starch, asbestos, clay, chalk, barytes, infusorial earth, etc. The plasticizers include alkyd resins, particularly those of the oil-modified type, dibutyl sebacate, dibutyl phthalate, tricresyl phosphate, diethoxy diethyl phthalate, etc. Pigments, lakes, dyes, metal powders or flakes, pearlescent materials, etc., may be incorporated to obtain various colors and effects.

The following examples will illustrate the invention—

Example 1.—117 parts of benzyl thioammeline (0.5 mol) was stirred into 121.5 parts of 37% formaldehyde solution (1.5 mol) and the mixture heated at 85° C. for 10 minutes. The oil which separated on cooling was washed with water and dissolved in alcohol to form a solution useful for impregnating paper or other fibrous material. When the impregnated sheet was heated at 150° C., the condensate was converted to an insoluble resin which was highly water-resistant.

When allowed to stand for some time the oil deposits crystals which are probably a methylol derivative of the S-benzyl thioammeline. This derivative has a low melting point and on heating to about 150° C. yields a clear mass which finally hardens to a water-insoluble resin.

Example 2.—A 37% solution of formaldehyde was adjusted to a pH of 7 by the addition of a small amount of soda ash. 121.5 parts of this solution was warmed to 85° C. and 117 parts of S-benzyl thioammeline stirred into the solution. In about five minutes all of the added material had dissolved and after another ten minutes the liquid became cloudy and separated into two phases. The lower layer was removed and washed twice with small portions of cold water. 80 parts of denatured alcohol and 15 parts of urea were mixed with this material and the mixture heated at 60° C. for about an hour. The final ratio of formaldehyde to total NH$_2$ groups was 2:1. The product contained 50% solids and had a viscosity of A on the Gardner-Holdt scale. Coatings prepared from this material had good water-resistance and did not spot with boiling water.

Example 3.—A condensate of urea and formaldehyde was prepared by reacting 1 mol of urea with 2.3 mols of formaldehyde in 40% aqueous solution. The solution was heated at 100° C. until a viscosity of 75–100 seconds Saybolt was reached. The solution of condensate was then cooled and to 211 parts thereof 24.3 parts of a 37% solution of formaldehyde which had been adjusted to a pH of 7.4, and 43 parts of S-benzyl thioammeline were added. The mixture was maintained at 80° C. and stirred until the benzyl thioammeline dissolved. After two hours' heating 4.7 parts of thiourea and 21.8 parts of urea were added and heating continued for an hour at about 60° C. 100 parts of denatured ethyl alcohol was then added and the whole solution filtered through infusorial earth. The product, a water-white, clear solution, had a solids content of about 39%, a ratio of formaldehyde to carbamide amino groups of 1.53 to one, a viscosity above 100 seconds Saybolt, a specific gravity of 1.1, and a pH of 7.

*Example 4.*—A reaction mixture of 55.6 parts of paraformaldehyde, 100 parts of ethanol, and 144 parts of S-benzyl thioammeline was heated under reflux for an hour to form a methylol benzylthioammeline. 2.5 parts by volume of formic acid was then added and refluxing continued to bring about further condensation and ethylation of some of the methylol groups. 25 parts by weight of benzene and 125 parts by weight of ethanol were added and the ternary mixture of benzene, alcohol, and water was distilled out. In this way the theoretical amount (3 mols) of water was separated. There remained a viscous, slightly yellow resin solution which had a viscosity at 25° C. of K on the Gardner-Holdt scale and a solids content of 72.6%. The resin is exceptionally compatible with organic solvents and miscible with many types of resins and resinous condensates.

Films were formed on glass and baked at temperatures of 200° F. to 300° F. for intervals from 90 to 30 minutes. The films are tough and hard, although somewhat brittle. Castor oil, an oil modified alkyd resin, or a plasticizer such as the ethoxy-ethyl ester of phthalic acid, can be added to this resin to reduce the brittleness without noticeably affecting the hardness and toughness.

Other S-benzyl thioammeline-formaldehyde-alcohol condensates, for example from propanol, butanol, pentanols, glycerine, glycol, glycol monoethers, etc., may be prepared by the same method.

*Example 5.*—An aqueous urea-formaldehyde condensate was prepared by heating under pressure one mol of urea with 1.7 mols of aqueous formaldehyde until the solution had a Saybolt viscosity of 80 to 85 seconds. To one hundred parts of this condensate solution at 80° C. were added 13.2 parts of 37% aqueous formaldehyde and 9.2 parts of S-benzyl thioammeline. The mixture was maintained at 80° C. and stirred for one-half hour. The pH was then adjusted with a little soda ash to a value of 7 and the condensation continued for another hour, at which time the viscosity had reached 180 seconds Saybolt. The clear solution was cooled to 60° C. and 7.3 parts of thiourea and 6.1 parts of urea added. The solution was stirred at 60° C. for another hour.

The product was a water-white resin solution containing 48% of solids, and having a Saybolt viscosity of 153 seconds (25° C.) a specific gravity of 1.196 and a pH of 7.

*Example 6.*—70 parts of S-benzyl thioammeline was added to 73 parts of a 37% solution of formaldehyde previously heated to 85° C., the mixture refluxed at 100° C. for 10 minutes and cooled. The solution separated into layers and the water layer was removed. 45 parts of ethanol and 9.4 parts of calcium chloride were then added to the residue and the mixture was heated at 89° C. for 30 minutes. 0.25 part of a 50% solution of formic acid was added and the mixture heated under reflux for three minutes. The resulting solution had a solids content of 70% and a viscosity of Z+ on the Gardner-Holdt scale at 25° C.

*Example 7.*—A mixture of 11.65 parts of S-benzyl thioammeline, 6.60 parts of acetaldehyde, and 33.0 parts of ethanol was heated under reflux for 4 hours. A slightly yellow solution of a resinous condensate was obtained. The viscosity of the solution was A— on the Gardner-Holdt scale. The solution could be diluted with 3 parts of xylol by weight without precipitation. A film formed from the solution was hard, tack-free, and clear.

*Example 8.*—A mixture of 11.65 parts of S-benzyl thioammeline, 15.9 parts of benzaldehyde, and 33.3 parts of ethanol was heated under reflux for 4 hours. A clear, slightly yellow solution of a resinous condensate was obtained. This solution could be diluted with 8 parts by weight of xylene without precipitation. The solution was used to coat a glass plate which was then dried in an oven at 125° C. A dry, hard film was obtained, which was fusible at a higher temperature.

*Example 9.*—A mixture of 9 grams (0.3 mol) of paraformaldehyde, 23.3 grams (0.1 mol) of S-benzyl thioammeline and 30 grams (0.4 mol) of butanol was heated for ten minutes at 100° C. 2 cc. of 50% formic acid was then added and the solution heated to refluxing temperature until no more water was evolved. The product is a colorless resin compatible with toluene or xylene.

The soluble products obtained according to the procedure given in the foregoing examples are all intermediate condensation products of the S-benzyl thioammeline and aldehyde or S-benzyl thioammeline, aldehyde and alcohol. On heating to about 150° for a short time they are converted to hard, insoluble resins. This conversion is accelerated by acids or acidic salts such as acetic, lactic, tartaric, citric, phthalic, etc., acids, the hydrochlorides of amines such as methylamine hydrochloride, sodium acid sulfate, ammonium acid phosphates, etc., and potentially acid salts such as ammonium thiocyanate, barium ethyl sulfate, ammonium chloride, alum, etc. The oily condensates which first form may be used directly for coating purposes or they may be mixed with various colors, fillers, etc., and used as molding powders. In preparing a molding powder the filler may be impregnated with a solution of the intermediate S-benzyl thioammeline aldehyde condensation product, the solvent evaporated and the residual powder dried at temperatures below that at which the resin will harden.

Solutions of the intermediate condensates may be used to impregnate porous materials such as paper or cloth for the purpose of manufacturing laminated articles. Several sheets of paper for example impregnated with the intermediate condensate described in any of the examples may be pressed together at 125 to 175° C. at pressures of 1000 pounds or more per square inch. A translucent panel may be made from five or six sheets of paper impregnated with the intermediate condensate described in Example 1 and cured for 15 minutes at 160° C. and 1400 lbs./sq. in. pressure. The same result can be obtained by curing at 130° for 45 minutes. The panels thus obtained are very resistant to water and will not spot when exposed to boiling water for 15 minutes. Sheets of cloth or paper impregnated with the S-benzyl thioammeline aldehyde condensation products may be combined with sheets of similar material impregnated with other hardenable resins such as phenol or urea formaldehyde resins.

Solutions of the condensation products are good adhesives for uniting various materials such as wood, cork, paper, cardboard, cloth, metal, glass, etc., and may also be used as binders for pigments, printing pastes, and abrasives. A good adhesive for plywood may be made by mixing 120 parts of the resin solution obtained according to Example 3 with 50 parts of wheat flour and 10 parts of a 40% solution of ammonium thiocyanate. A paste of this composition was spread on 1/16" birch veneer at the rate of 0.03 lb. per sq. ft. A three ply veneer was then made up and cured for 10 minutes at 250° F. and 220 lbs./sq. in. A well bonded plywood was obtained.

Woven and knit fabrics may be treated with the S-benzyl thioammeline resins for the purpose of imparting various finishes. The fabric may be glazed or coated or treated to increase the resistance to creasing, or to improve the hand, bulk, draping qualities, and dyeing qualities as well for delustering synthetic fibers. The condensation products may also be used on fabrics in conjunction with the usual sizes such as starch, cellulose ethers, polyvinyl alcohol, etc.

The following will illustrate the use of the S-benzyl thioammeline aldehyde condensation products in the finishing of textiles—

A treating bath was prepared by dispersing a solution of the resin obtained according to Example 1 in water, the concentration of the dispersed resin being 1%, and 7% of diammonium phosphate calculated on the resin was added. A 60 x 68, 2 yd. 39" all spun blue slub rayon dress fabric was padded through this solution, picking up about 75% of solution calculated on the dry weight of the fabric. The cloth was then dried on a tenter and the resin which adhered to it was cured in a loop drier at 300° F. The finished fabric had a much better hand and a greater apparent bulk than the original fabric.

Another piece of the same fabric was padded through a similar bath containing 5% of the same resin. The fabric was squeezed to an 80% pick-up, dried to 37" width on a tenter equipped with an over feed and loop dried for five minutes at 300° F. The resulting fabric had a shrinkage only one-third that of the original fabric and could be shrunk by any of the well-known mechanical methods to a stable fabric.

A bath containing 20% of the resin made according to Example 2 was prepared by diluting the 50% solution described therein with water and alcohol. Diammonium phosphate to the amount of 3% of the resin was added. A piece of the same rayon fabric was impregnated with this solution, picking up 85%. The cloth was then dried at 240–260° F. to 39" width on a 90 foot tenter running 60 yards per minute and the resin was cured in a loop drier at 290–310° F. for five minutes. The treated fabric had a satisfactory resistance to crumpling and creasing which was maintained after laundering.

The S-benzyl thioammeline aldehyde condensation products, particularly those condensed in the presence of an alcohol are useful in the preparation of various types of coating compositions. These resins may be used alone or in conjunction with other resins or in oleoresinous varnishes and cellulose nitrate lacquers. Thus a mixture of the resin made according to Example 4 and a linseed oil modified alkyd resin was made up and a small amount of a cobalt drier added. Titanium oxide was ground in and the resulting enamel applied to wood and metal. The dried films obtained from this composition were hard, flexible, glossy and resistant to soaps, alcohol and water.

The S-benzyl thioammeline aldehyde condensates are particularly advantageous in cellulose nitrate lacquers on account of their solubility in the various solvents and diluents used and also on account of their compatibility with most of the resins commonly used in such lacquers. They may also be used in cellulose ether coatings and in conjunction with phenol formaldehyde resins for the manufacture of various types of coating materials.

In conjunction with non-drying oil modified alkyd resins the S-benzyl thioammeline resins yield products which are useful in the manufacture of translucent or transparent sheets of paper or fabrics which are waterproof and gasproof and can be employed in the manufacture of wrappings, umbrella and raincoat fabrics, etc.

I claim:

1. The process which comprises heating at reacting temperatures a mixture of S-benzyl thioammeline and an aldehyde.

2. The process which comprises heating at reacting temperatures a mixture of S-benzyl thioammeline and formaldehyde.

3. The process which comprises heating at reacting temperatures a mixture of S-benzyl thioammeline, an aldehyde and a carbamide.

4. The process which comprises heating at reacting temperatures a mixture of S-benzyl thioammeline, formaldehyde and urea.

5. The process which comprises heating at reacting temperatures a mixture of S-benzyl thioammeline, an aldehyde and a compound containing an alcoholic hydroxyl group.

6. The process which comprises heating at reacting temperatures in the presence of an acid catalyst a mixture of S-benzyl thioammeline, an aldehyde and a compound containing an alcoholic hydroxyl group.

7. The process which comprises heating at a temperature of from 70 to 125° C. in the presence of an acid catalyst a mixture of S-benzyl thioammeline, an aldehyde and a monohydric aliphatic alcohol, and removing the water from the reaction mixture as it is formed.

8. The process which comprises heating at reacting temperatures in the presence of an acid catalyst a mixture of ethanol, S-benzyl thioammeline and formaldehyde and removing the water from the reaction mixture as it is formed.

9. The process which comprises heating at reacting temperatures in the presence of an acid catalyst a mixture of butanol, S-benzyl thioammeline and formaldehyde and removing the water from the reaction mixture as it is formed.

10. The process which comprises heating at reacting temperatures in a substantially neutral solution, an aldehyde and S-benzyl thioammeline until the solution becomes turbid, cooling the mixture, removing the aqueous layer, dissolving the residue in a monohydric alcohol, adding an acid catalyst and heating to reacting temperature, removing the water of condensation as it is formed.

11. As new compositions of matter the products resulting from the condensation of S-benzyl thioammeline and an aldehyde by heating at reacting temperatures.

12. As new compositions of matter the products resulting from the condensation of S-benzyl thioammeline and formaldehyde by heating at reacting temperatures.

13. As new compositions of matter the products resulting from the condensation of S-benzyl thioammeline, an aldehyde, and a carbamide by heating at reacting temperatures.

14. As new compositions of matter the products resulting from the condensation of S-benzyl thioammeline, formaldehyde, and urea by heating at reacting temperatures.

15. As new compositions of matter the products resulting from the condensation of S-benzyl thioammeline, an aldehyde and a compound containing an alcoholic hydroxyl group by heating at reacting temperatures.

16. As new compositions of matter the products resulting from the condensation of S-benzyl thioammeline, formaldehyde and ethanol by heating at reacting temperatures.

17. As new compositions of matter the products resulting from the condensation of S-benzyl thioammeline, formaldehyde and butanol by heating at reacting temperatures.

HERMAN A. BRUSON.